A. J. COUGHENOUR.
EGG AND BUTTER CARRIER.
APPLICATION FILED APR. 18, 1914.
1,148,958.
Patented Aug. 3, 1915.
3 SHEETS—SHEET 1.
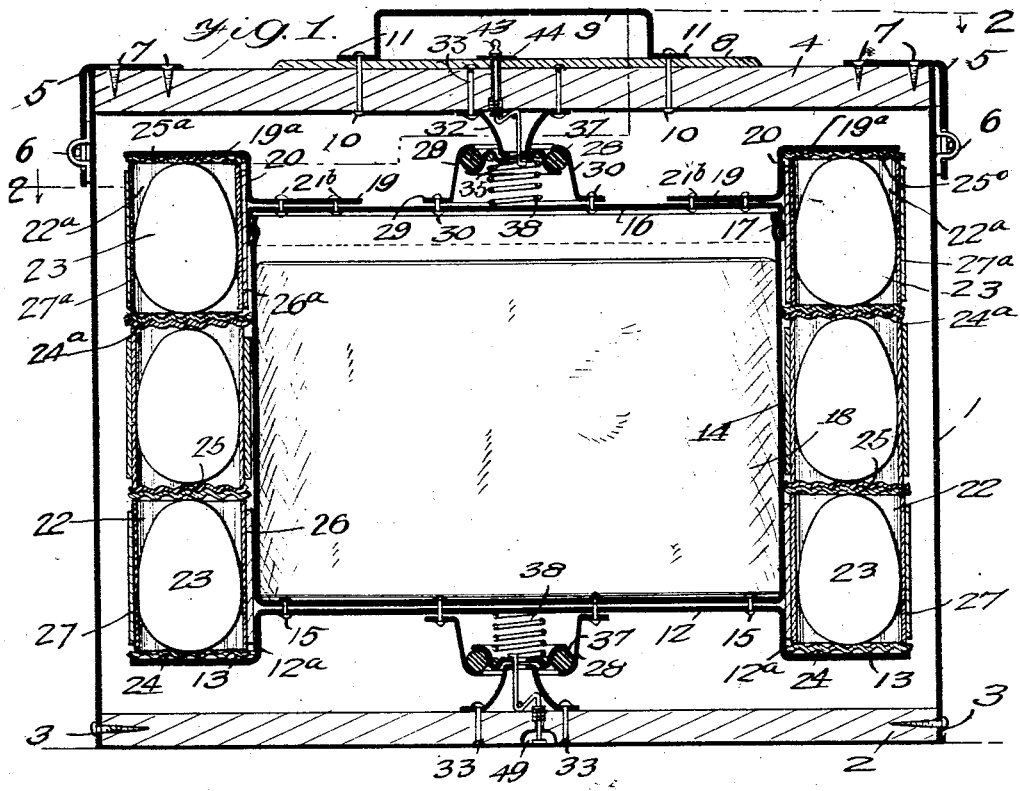
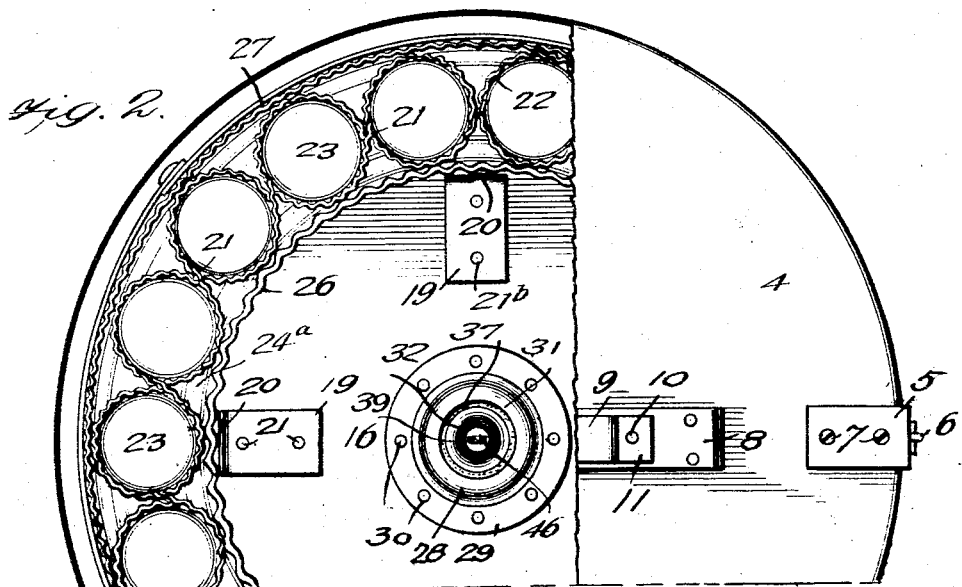
WITNESSES
INVENTOR
Allen J. Coughenour
BY
ATTORNEYS A. J. COUGHENOUR.
EGG AND BUTTER CARRIER.
APPLICATION FILED APR. 18, 1914.
1,148,958. Patented Aug. 3, 1915.
3 SHEETS—SHEET 2.
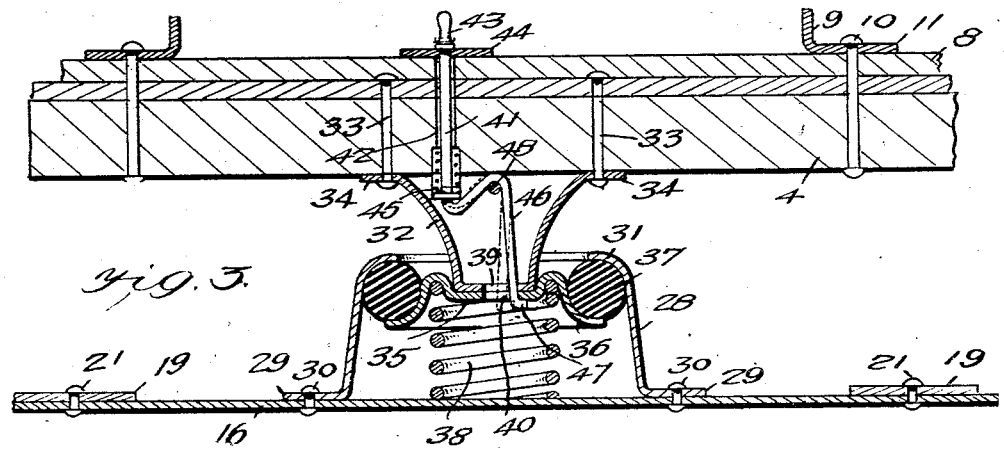
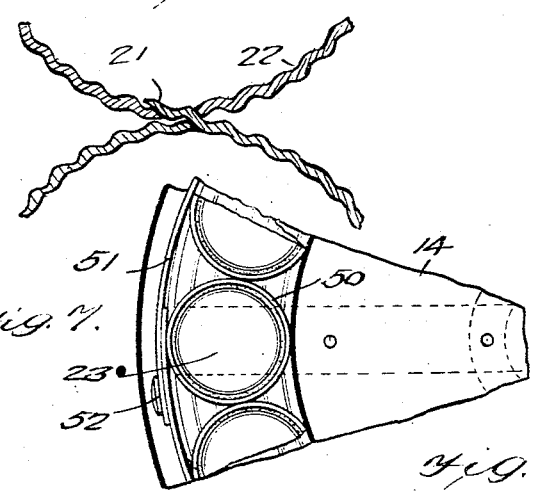
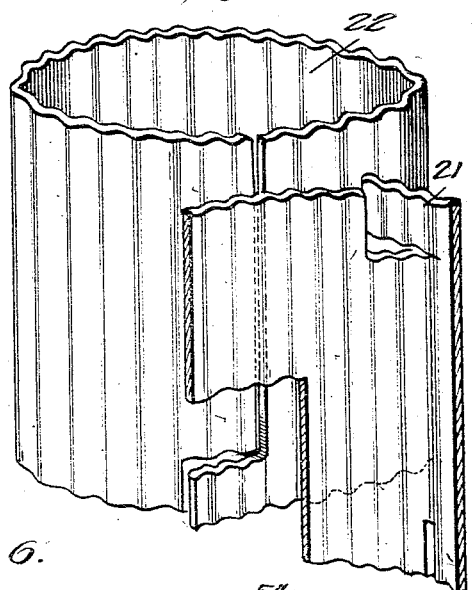
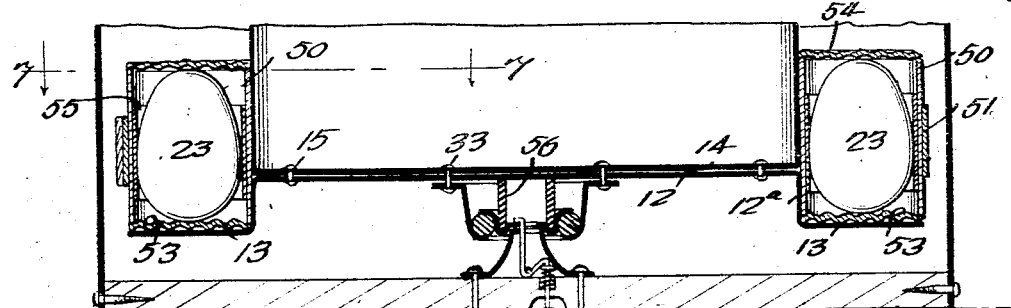
WITNESSES
F. C. Barry
C. E. Traynor
INVENTOR
Allen J. Coughenour
BY Munn & Co.
ATTORNEYS A. J. COUGHENOUR.
EGG AND BUTTER CARRIER.
APPLICATION FILED APR. 18, 1914.
1,148,958.
Patented Aug. 3, 1915.
3 SHEETS—SHEET 3.
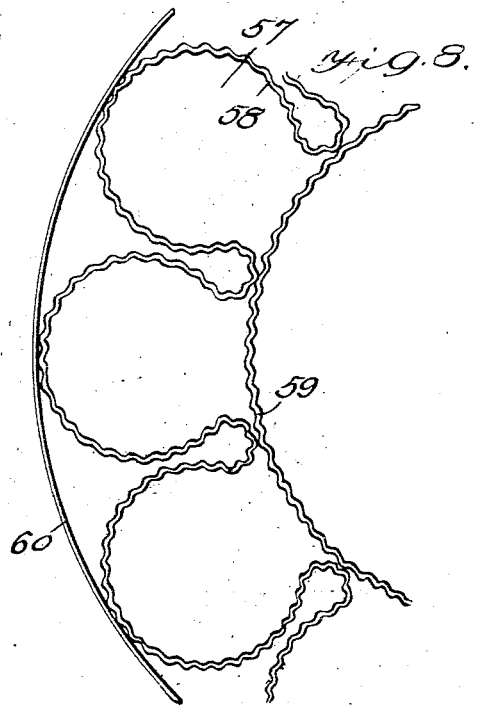
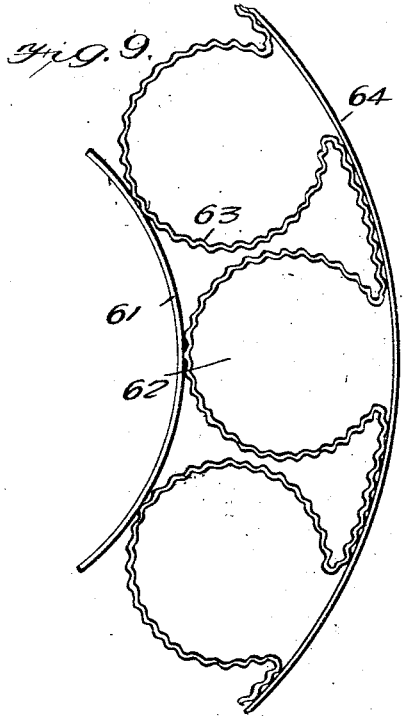
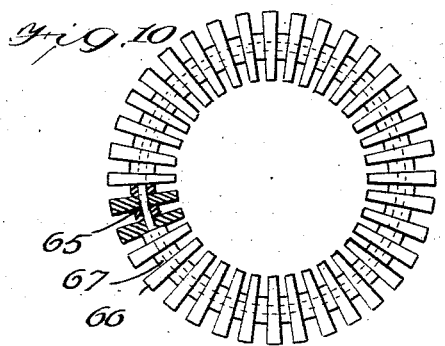
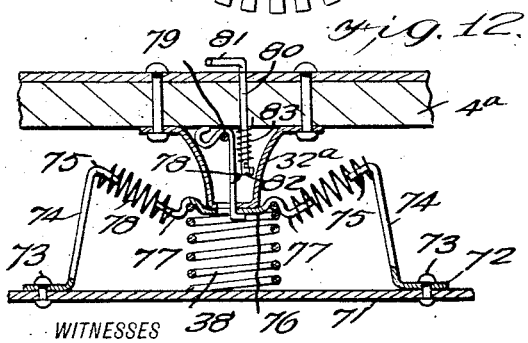
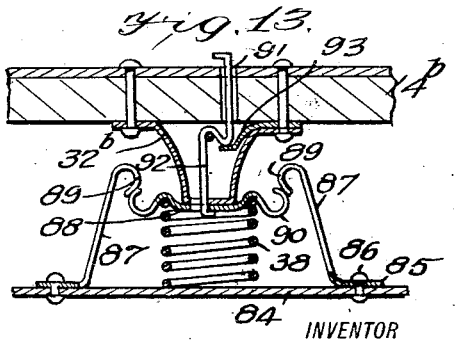
WITNESSES
H. E. Berry
C. E. Tramer
INVENTOR
Allen J. Coughenour
BY Munn & Co.
ATTORNEYS

UNITED STATES PATENT OFFICE.

ALLEN J. COUGHENOUR, OF KANSAS CITY, MISSOURI.

EGG AND BUTTER CARRIER.

1,148,958.   Specification of Letters Patent.   Patented Aug. 3, 1915.

Application filed April 18, 1914. Serial No. 832,911.

*To all whom it may concern:*

Be it known that I, ALLEN J. COUGHENOUR, a citizen of the United States, and a resident of Kansas City, in the county of Jackson and State of Missouri, have made certain new and useful Improvements in Egg and Butter Carriers, of which the following is a specification.

My invention is an improvement in egg and butter carriers, and has for its object to provide a carrier of the character specified, especially adapted for the transportation of eggs and butter, incandescent light bulbs, bottle goods, and like fragile articles by parcel post, express or the like, wherein an outer casing is provided and an inner carrier or container for the articles, cushioned against the outer casing.

In the drawings: Figure 1 is a transverse vertical section through the improved carrier, Fig. 2 is a section on the line 2—2 of Fig. 1, looking in the direction of the arrows adjacent to the line, showing an elastic support for the articles, Fig. 3 is an enlarged sectional view of a portion of the top support, Fig. 4 is a transverse section of a portion of a supporting element for the article, Fig. 5 is a perspective view of a portion of the said element with parts broken away, Fig. 6 is an enlarged section of the lower end of the carrier showing a modified form of cushion, Fig. 7 is a section on the line 7—7 of Fig. 6, looking in the direction of the arrows, Figs. 8 and 9 are top plan views of modified constructions of supporting elements, Fig. 10 is a top plan view of a modified form of ring, with parts in section, Fig. 11 is a horizontal section of another modification, and Figs. 12 and 13 are sectional views of modified forms of top supports.

In the present embodiment of the invention shown in Figs. 1 to 7 inclusive, the carrier comprises a receptacle consisting of a cylindrical body 1, having a base 2 which is arranged within the lower end of the body, and secured to the body by means of screw nails 3 or the like. A cover is provided, the cover consisting of a disk 4 fitting within the upper end of the body of the receptacle, and provided with hasps 5, which are adapted to engage staples 6 on the body, the hasps being secured to the disk 4 by means of screws 7 or the like.

A plate 8 is arranged diametrically of the cover, and a handle 9 is connected to the plate 8 and to the cover by means of rivets 10 or the like, the rivets passing through lugs 11 at the ends of the handle, and through the plate 9 and the cover to connect the parts together. Within the receptacle is arranged a carrier, the carrier comprising a central compartment for containing butter or the like, and a plurality of annular series of smaller compartments for containing eggs or like articles.

A disk 12 is provided, the disk having a portion at its periphery of annular form offset laterally downward with respect to the body of the disk, as indicated at 13. A cup-shaped holder 14 of the same diameter as the body of the disk 12 is seated on the said body, and is secured to the body by means of rivets 15.

A cover 16 is provided for the receptacle 14, the said cover being a disk having a marginal flange 17 which engages outside of the top of the container 14. The container 14 is adapted to receive a package 18 of butter, cheese or the like, the package being of a size to fit within the container or receptacle 14 tightly, and to extend from the bottom to near the top thereof. It is obvious that instead of a single package, a number of packages might be placed within the container 14.

A ring consisting of portions 19 and 19ᵃ offset laterally with respect to each other and parallel and connected by an integral web 20 is connected with the cover, the portion 19 of the ring being lapped upon the cover at the periphery thereof, and secured thereto by means of rivets 21ᵇ or the like, and the portion 19ᵃ of the ring is offset upwardly from the cover.

A series of holders is supported between the offset portion 13 of the disk 12 and the portion 19ᵃ of the ring 19—19ᵃ. Three series of containers are provided and all are alike, each series being formed from strips of pasteboard, papier mâché, or the like, corrugated for the sake of strength. Each series of containers is formed from strips 21 of suitable material corrugated as above specified, and the strips are interwoven to form substantially cylindrical pockets 22, each of a size to receive an egg 23 or the like.

An annular strip 24 of similar material is arranged on the upper face of the offset portion 13 of the disk 12, the said strip forming a support upon which the first series of eggs rest, and another strip 25 of the same material is arranged above the cylindrical containers 22. A second series of containers 22 is arranged above the first series supported by the portion 13 of the disk 12, and a third series of egg containers is arranged above the second series and in a manner to be described. The strips 24 and 25 extend entirely around the portion 13, and the lower ends of the containers 22 rest upon the strip 24. The strip 25 rests upon the upper ends of the containers 22, closing the tops of the containers. The second series of eggs and containers is arranged between the strips 25 and 24ª and the second series is held in place against the central container 14 by means of a strip or ring 27. The containers 22 are in fact open ended tubes, and it is obvious that they may be of many different constructions and arrangements. A strip 26 of similar material to the strips 21, 24 and 25 is arranged at the inner sides of the containers 22, the said strip resting against the web 12ª which connects the portion 13 of the disk 12 with the portion 12 and against the outer face of the body of the receptacle. Another strip 27 of similar material is arranged outside of the containers 22, the said strip holding the containers against the strip 26.

The strips 26 and 27 are continuous rings, and it will be obvious that they will hold the several containers 22 in proper position. The upper series of containers 22ª is precisely like the intermediate and lower series 22, and strips 24ª and 25ª are arranged below and above the containers. Strips 26ª and 27ª are arranged on the inner and outer sides of the containers in the same manner as the strips 26 and 27 of the series 22. The strip 25ª rests against the portion 19ª of the ring 19—19ª. The complete series of containers, namely the container 14 and the containers 22 and 22ª is cushioned against both top and bottom of the outer casing or receptacle, by means of the mechanism shown in Figs. 1, and 3. The supporting mechanism is the same for the top and the bottom.

A frusto-conical sleeve 28 is connected to the top 16 of the container 14 and to the body of the disk 12, said sleeve having an outwardly extending radial flange 29 at its large or lower end, which is lapped upon the upper face of the cover 16, and secured thereto by rivets 30 or the like. At its upper small end the sleeve is provided with an inwardly curved flange 31. A frusto-conical sleeve 32 is connected with the disk 4 of the cover and with the bottom 2 by means of rivets 33 or the like, the rivets passing through the disk and through a marginal radial flange 34 at the large end of the sleeve.

The outer surface of the sleeve 28 is slightly convex longitudinally, while the outer surface of the sleeve 32 is concave longitudinally, and the small or lower end of the sleeve 32 is adapted to pass into the open upper end of the sleeve 28. A washer 35 is arranged at the small end of the sleeve 32 and within the sleeve 28, the said washer having a concave flange 36 which is opposite the flange 31 of the sleeve 28, and a ring 37 of rubber is arranged between the flanges 31 and 36.

A coil spring 38 is arranged within the sleeve 28 between the body of the washer 35 and the cover 16, the upper end of the spring engaging the washer at the junction of the flange 36 therewith. The small end of the sleeve 32 is provided with an opening 39, and the body of the washer 35 is provided with a similar opening 40 registering with the opening 39. A bolt 41 is journaled in an opening 42 in the cover 4, the bolt having at its upper end a handle 43 which extends above the cover at the handle 9.

A washer 44 of rubber or the like encircles the bolt at the outer end of the opening 42 and the bolt is supported by a bearing angle bracket 45 on the inner face of the cover. The bolt is provided with an extension 46 which passes through the openings 39 and 40 and is provided with a lateral lug 47 which is adapted to engage beneath the washer 35 at the opening 40 to lock the washer against the closed end of the sleeve 32. A staple 48 holds the extension against the inner face of the cover. When the handle 43 is operated to draw the bolt 41 upward the extension 46 will be swung to disengage the lug 47 from beneath the washer. The lower end of the supporting mechanism for the butter and eggs as shown in Fig. 1 is precisely the same.

It will be noticed from an inspection of Figs. 1 and 6, that the handle of the lower bolt is normally within the recess or opening 49 in the under face of the bottom, in order to prevent engagement of the said handle with the supporting surface for the outer casing or receptacle. The washer 44 is designed to prevent the entrance of moisture, as for instance rain, into the opening 42.

In Figs. 6 and 7 the containers for the eggs are tubes 50, and the tubes are held against the web 12ª of the disk 12 and against the body of the container 14 by means of a band 51 of elastic material. The band 51 is in the form of a strip, having a snap fastener 52 at its ends, and the tubular containers 50 rest upon corrugated strips or rings 53 which rest upon the portion 13 of the disk 12, and another strip or ring 54 is arranged at the upper ends of the tubes. Within each of the containers 50 an article 23 is arranged as shown, and a ring 55 of felt or the like is arranged between the article, and the inner wall of the container. In this construction also the upper and lower supports for the article holder differ slightly from those shown in Figs. 1 and 3, in that the spring 38 is dispensed with, being replaced by a sleeve 56 of rubber or the like, the sleeve being placed in precisely the same position as the coil spring.

It will be evident that the individual containers might be constructed in many different manners, as for instance in Fig. 8 the individual containers 57 for the articles are formed from a strip 58 of suitable material transversely corrugated, and bent to form open holders, the openings being at the inner sides of the holders. A ring or cylinder 59 of similar material is arranged at the inner sides of the holders or containers for closing the openings, and the containers are held against the central container 14 by means of a band 60 similar to the band 51 of Figs. 6 and 7.

The ring or cylinder 59 may be of plain material as shown at 61 in Fig. 9, and the individual containers 62 for the articles may be formed by a strip 63 similar to the strip 58 but arranged in such manner as to form open containers, the openings being outward instead of inward. With this construction the outward openings are closed by a band 64 similar to band 60, and the said band holds the containers and the articles against the cylinder 61. In Fig. 10 is shown a construction of ring that may be used in place of the ring 37, shown in Fig. 1, wherein a plurality of series of rubber disks or washers is arranged on an annular frame or rings 65 of wire or the like. The members 66 of one of the series of washers are of larger size than the members 67 of the other series, and the washers 66 are arranged alternately with respect to the washers 67. Each of the washers 66 and 67 is wedge-shaped as a whole, and the washers are arranged with the small end inwardly. With this arrangement a series of inwardly extending resilient fingers is provided for engaging the flange 36 of the washer 35, and an outwardly extending series of resilient fingers for engaging the flange 31 of the sleeve 28. A slight modification of this construction is shown in Fig. 11, where the frame 68 of wire or the like has molded thereon a covering of rubber having inwardly extending points 69 and outwardly extending points 70. Either of the above forms is especially resilient, and any desired degree of resilience may be obtained by increasing or diminishing the thickness of the washers or of the points 69 and 70.

In Fig. 12 a modified form of cushioning device for the ends of the article holder proper is shown. In this arrangement the cover 4ᵃ and the disk 71 are cushioned against each other by means of a ring 72 which is secured to the disk 71 by means of rivets 73 or the like. The ring is provided with fingers 74 extending toward the cover 4ᵃ, and the fingers also extend slightly inward toward each other. Each finger is provided at the end remote from the disk 71 with an inwardly and backwardly extending lug 75. The sleeve 32ᵃ secured to the cover is similar to the sleeve 32 of Fig. 3, and the washer 76 which corresponds to the washer 35 is provided with outwardly extending lugs 77 which normally aline with the lugs 75 of the fingers 74.

Coil springs 78 are arranged between the washer and the fingers, each spring engaging a lug 75 at one end and a lug 77 at the other. The spring 38 is arranged in the same manner in this construction as in Fig. 3. The locking device is in the form of a resilient latch 78 held to the cover by a staple 79, and the latch is operated by means of a rotatable bolt 80 journaled in the cover, and provided with an angular handle 81 at its outer end, and with a lug 82 at its inner end.

A coil spring 83 encircles the bolt, one end being secured to the cover and the other to the bolt. The latch is adapted to engage beneath the washer in the same manner as the extension 46 on the bolt 41, and the latch may be released by means of the lug 82 on the bolt 80.

In Fig. 13 the cover 4ᵇ is cushioned against the disk 84 by means of a washer 85 secured to the disk by rivets 86 and having fingers 87 similar to the fingers 74 of the washer 72. The sleeve 32ᵇ corresponds to the sleeves 32 and 32ᵃ and the washer 88 is arranged in the same manner with respect to the sleeve 32ᵇ, and with respect to spring 38, the spring pressing the washer against the sleeve 32ᵇ. Each of the fingers 87 is provided with a curved lug 89 at the end remote from the disk 84, and the washer is provided with similar lugs 90. The free end of each lug 90 bears against the free end of an adjacent lug 89. The bolt 91 resembles the bolt 41, the said bolt 91 having an extension 92 which locks the washer against the end of the sleeve 32ᵇ.

A spring 93 is arranged between one side of the flange of the sleeve 32ᵇ and the cover, the free end of the spring bearing against the lower end of the bolt to normally hold the bolt in locked position. The bolt is released, by pressing downward on the upper end of the same. It will be noted from an inspection of Fig. 13, that the openings of the sleeve 32ᵇ and of the washer are eccentric instead of central.

The operation of the constructions shown in Figs. 1, 6, 12 and 13 is precisely the same, each construction being designed to cushion the holder proper for the articles against the outer casing or shipping receptacle. While the improved carrier has been described as carrying eggs and butter, it is obvious that it might be used with equal advantage for carrying electric light bulbs, dynamite caps and explosives of all kinds, or any other article wherein it is desired to prevent injury to the same during transit.

The constructions shown in Figs. 10 and 11 are modified forms of the ring 37 shown in Figs. 1 and 3, and may be used in place of the said rings. Either the device shown in Fig. 10 or that shown in Fig. 11 may be substituted for the ring 37 at the top and the bottom of the container.

It will be understood that the portions 13 and 19ª of the disk and ring respectively are spaced apart far enough to receive three series of egg carriers, and the carriers of the several series are held between the said offset portions. The lowermost series of carriers rests on the portion 13, the intermediate series rests on the first series, and the carriers of the uppermost series rest on those of the intermediate series.

I claim:—

1. A carrier for the transportation of fragile articles, comprising a substantially cylindrical outer casing having a removable cover, a central substantially cylindrical casing arranged within the outer casing in spaced relation and having a removable cover, a disk secured to the bottom of the inner casing and having an annular downwardly offset portion extending radially beyond the inner container, a ring secured to the cover and having an upwardly offset radially extending portion, a series of individual containers seated on each of the said portions, and a cushioning means between each end of the inner carrier and the outer casing, each of the said cushioning means comprising a frusto-conical sleeve secured to the inner carrier and a similar sleeve secured to the adjacent end of the outer casing, the small ends of the sleeves being free, the sleeves of the inner carriers having inwardly extending curved flanges, a washer within each of the said sleeves and having a curved flange arranged opposite the flange of the sleeve, a rubber ring between the flanges, a spring between each washer and the adjacent end of the inner carrier, and means for locking each washer against the inner end of the spring of the outer casing, said locking means being releasable.

2. A carrier for the transportation of fragile articles, comprising a substantially cylindrical outer casing having a removable cover, a central substantially cylindrical casing arranged within the outer casing in spaced relation and having a removable cover, a disk secured to the bottom of the inner casing and having an annular downwardly offset portion extending radially beyond the inner container, a ring secured to the cover and having an upwardly offset radially extending portion, a series of individual containers seated on each of the said portions, and a cushioning means between each end of the inner carrier and the outer casing, each of the said cushioning means comprising a frusto-conical sleeve secured to the inner carrier and a similar sleeve secured to the adjacent end of the outer casing, the small ends of the sleeves being free, the sleeves of the inner carrier having inwardly extending curved flanges, a washer within each of the said sleeves and having a curved flange arranged opposite the flange of the sleeve, a rubber ring between the flanges, a coil spring between each washer and the adjacent end of the inner carrier, and means for locking each washer against the inner end of the spring of the outer casing.

3. A carrier for the transportation of fragile articles, comprising a substantially cylindrical outer casing having a removable cover, a central substantially cylindrical casing arranged within the outer casing in spaced relation and having a removable cover, a disk secured to the bottom of the inner casing and having an annular downwardly offset portion extending radially beyond the inner container, a ring secured to the cover and having an upwardly offset radially extending portion, a series of individual containers seated on each of the said portions, and a cushioning means between each end of the inner carrier and the outer casing, each of the said cushioning means comprising a sleeve secured to the inner carrier and a similar sleeve secured to the adjacent end of the outer casing, the small ends of the sleeves being free, the sleeves of the inner carriers having inwardly extending curved flanges, a washer within each of the said sleeves and having a curved flange arranged opposite the flange of the sleeve, a rubber ring between the flanges, and a coil spring between each washer and the adjacent end of the inner carrier.

4. A carrier for the transportation of fragile articles, comprising a substantially cylindrical outer casing having a removable cover, a central substantially cylindrical casing arranged within the outer casing in spaced relation and having a removable cover, a disk secured to the bottom of the inner casing and having an annular downwardly offset portion extending radially beyond the inner container, a ring secured to the cover and having an upwardly offset radially extending portion, a series of individual containers seated on each of the said portions, and a cushioning means between each end of the inner carrier and the outer casing, each of the said means comprising a sleeve secured to the end of the outer casing, a washer seated against the free end of the said sleeve, a cushion between each washer and the adjacent end of the inner carrier, a spring support secured to the inner carrier and encircling the washer, a cushioning device between the said support and the washer, and means for locking each washer to the sleeve of the outer casing.

5. A carrier for the transportation of fragile articles, comprising a substantially cylindrical outer casing having a removable cover, a central substantially cylindrical casing arranged within the outer casing in spaced relation and having a removable cover, a disk secured to the bottom of the inner casing and having an annular downwardly offset portion extending radially beyond the inner container, a ring secured to the cover and having an upwardly offset radially extending portion, a series of individual containers seated on each of the said portions, and a cushioning means between each end of the inner carrier and the outer casing, each of the said means comprising a sleeve secured to the end of the outer casing, a washer seated against the free end of the said sleeve, a cushion between each washer and the adjacent end of the inner carrier, a spring support secured to the inner carrier and encircling the washer, and a cushioning device between the said support and the washer.

6. A carrier for the transportation of fragile articles, comprising a substantially cylindrical outer casing having a removable cover, a central substantially cylindrical casing arranged within the outer casing in spaced relation and having a removable cover, a disk secured to the bottom of the inner casing and having an annular downwardly offset portion extending radially beyond the inner container, a ring secured to the cover and having an upwardly offset radially extending portion, a series of individual containers seated on each of the said portions, and a cushioning means between each end of the inner casing and the outer casing.

7. In a device of the character specified, individual holders for articles of tubular form, and composed of strips of flexible material transversely corrugated and formed into holders, said holders being arranged in annular form, a support for the inner sides of the holders, and an elastic strip having a fastener at its ends for encircling the holders to hold them against the support.

8. A carrier for the transportation of fragile articles, comprising a substantially cylindrical outer casing having a removable cover, a central substantially cylindrical casing arranged within the outer casing in spaced relation and having a removable cover, and a cushioning means between each end of the inner carrier and the outer casing, each of the said means comprising a sleeve secured to the end of the outer casing, a washer seated against the free end of the said sleeve, a cushion between each washer and the adjacent end of the inner carrier, a spring support secured to the inner carrier and encircling the washer, and cushioning devices between the said support and the washer.

ALLEN J. COUGHENOUR.

Witnesses:
A. J. HICKLE,
I. L. HOZARA.